United States Patent

[11] 3,582,573

[72] Inventor Allan S. Miller
 Wellesley, Mass.
[21] Appl. No. 782,200
[22] Filed Dec. 9, 1968
[45] Patented June 1, 1971
[73] Assignee Norton Research Corporation
 Cambridge, Mass.

[54] ELECTROLUMINESCENT DIODE WITH 1/E WIDTH OF LESS THAN ONE MIL. AND SOUND RECORDING SYSTEM
2 Claims, 4 Drawing Figs.

[52] U.S. Cl. .................................................. 179/100.3,
 313/108, 317/234, 346/107
[51] Int. Cl. ...................................................... G01d 9/42,
 G11b 7/12, H05b 33/16
[50] Field of Search ........................................... 179/100.3 f;
 346/107; 313/108 D; 317/235(27); 250/211 J;
 250/217 SS L; 331/94.5

[56] References Cited
UNITED STATES PATENTS

| | | | |
|---|---|---|---|
| 3,074,887 | 1/1963 | Carroll .......................... | 252/62.3 |
| 3,377,210 | 4/1968 | Somerville et al. ........... | 148/1.5 |
| 3,462,321 | 8/1969 | Vitrus ........................... | 148/172 |

OTHER REFERENCES

Kholuyanov, The roles of Boron, Nitrogen, and Gallium in the Electroluminescence of Silicon Carbide P N Junctions, Soviet Physics-Solid State, Vol. 7, No. 11, May 66, pp 2620–2624

Primary Examiner—Bernard Konick
Assistant Examiner—Raymond F. Cardillo, Jr.
Attorneys—Oliver W. Hayes and Jerry Cohen

ABSTRACT: An electroluminescent junction diode having sharply peaked light output is used in conjunction with a sound motion picture camera to record sound on motion picture film. Both the P and N portions of the diode have relatively high absorption coefficients to provide an exponential light output having a $1/e$ width of less than 1.0 mil.

d preferably equals zero

3,582,573

ELECTROLUMINESCENT DIODE WITH 1/E WIDTH OF LESS THAN ONE MIL. AND SOUND RECORDING SYSTEM

SUMMARY OF INVENTION

The present invention relates to improved data recording systems that use modulated light images on photographic film.

The present invention relates to improved electroluminescent junction diodes and sound recording systems for using such diodes. This application is directed to an improvement over the invention described in application Ser. No. 731,938, filed May 24, 1968, owned by assignee of this application.

In the exposure of a photographic film to a light signal corresponding to a sound signal, it has been recognized as important that the resultant photographic image have the minimum possible width in the direction of film travel in order to record reasonably high frequency sound. Accordingly, in the past, emphasis has been placed on providing a highly collimated light from an extremely narrow light source or a carefully focused beam of light from a wider source. Such systems necessitate expensive mountings and make the camera quite delicate, thereby preventing its use under conditions of shock, vibration and the like.

The invention is particularly concerned with a sound recording system containing an electroluminescent junction diode as a source of light for producing a latent image on a photographic film. The diode is positioned near the surface of the photographic film (and preferably in contact with that surface) so that light coming out of one edge of the diode junction impinges directly on the film. The diode preferably has the property that, when a current pulse is passed through the diode to create a flash of light therefrom, the resulting exposed area on a stationary reversal photosensitive film will have an exposure profile (as measured by a microdensitometer) which can be approximated by an exponential function in the form of $$T = T_0 \exp\left(-\frac{X}{L}\right)$$

where
 $T$ is the calculated transmission at any point on the profile;
 $T_o$ is the maximum transmission of the film at a point opposite the junction of the diode, i.e., where $X=0$;
 $X$ is the distance measured perpendicular to the plane of the diode junction along the film from the point opposite the diode junction ($X$ is always positive);
 $L$ is the characteristic width of half of the profile and equals $X$ at $I=0.37 T_o$, (0.37 being equal to $1/e$).

In the above equation, the symbols for exposure ($E$ and $E_o$) could be used in place of $T$ and $T_o$, since exposure is directly related to transmission as actually measured on a film, the specific relationship depending upon the shape of the exposure curves of the film, which may be reversal film or a combination of negative and positive films. While exposure is the more generic expression, transmission is usually measured and transmission is usually referred to.

The sound transducing system of the invention projects a sharply peaked image directly on the photographic film. The image of the diode, employed in the invention when recorded on a stationary film, appears under microscopic examination to have a broad base and a narrow peak. This is confirmed by microdensitometer transmission measurements. This sharp peak is sufficiently distinguishable from the remainder of the image when recorded on a moving film so that a relatively high frequency sound signal can be reproduced.

The present invention is primarily directed to providing a diode whose light output peak, as recorded on color film, has a narrow $1/e$ width ($2L$ width) which is about 1.2—1.3 mils in contrast to silicon carbide diodes of the type described in the above-mentioned copending application which have a $1/e$ width ($2L$ width) of about 2.2 mils. This result is achieved by providing an electroluminescent diode (preferably silicon carbide) having P and N regions both of which have a high absorption coefficient, i.e. above about 100 cm.[11]. With such a diode the calculated $1/e$ width of the light emitted from the diode (as distinguished from the recorded image) is about 0.8 mil. When the absorption coefficient is appreciably higher than 100 cm.[11] on one or both sides of the diode, the $1/e$ width is even less (e.g. about 0.6 mil, when one side has an absorption coefficient of 100 cm.[11] and the other has an absorption coefficient of 200 cm.[11]). In these discussions, the distinction between $1/e$ width of the light emitted from the diode and $1/e$ width of the image recorded on color film must be borne in mind. In general, it has been found that the image recorded on color film will have a $1/e$ width which is approximately 0.5 mil greater than the calculated (and measured) image width of the light emitted from the diode, this increase of 0.5 mil being due to the image "spread" which occurs during exposure and development of the color film.

For a fuller understanding of the nature and objects of the invention, reference should be had to the following detailed discussion thereof taken in connection with the accompanying drawings in which.

Figure 3:
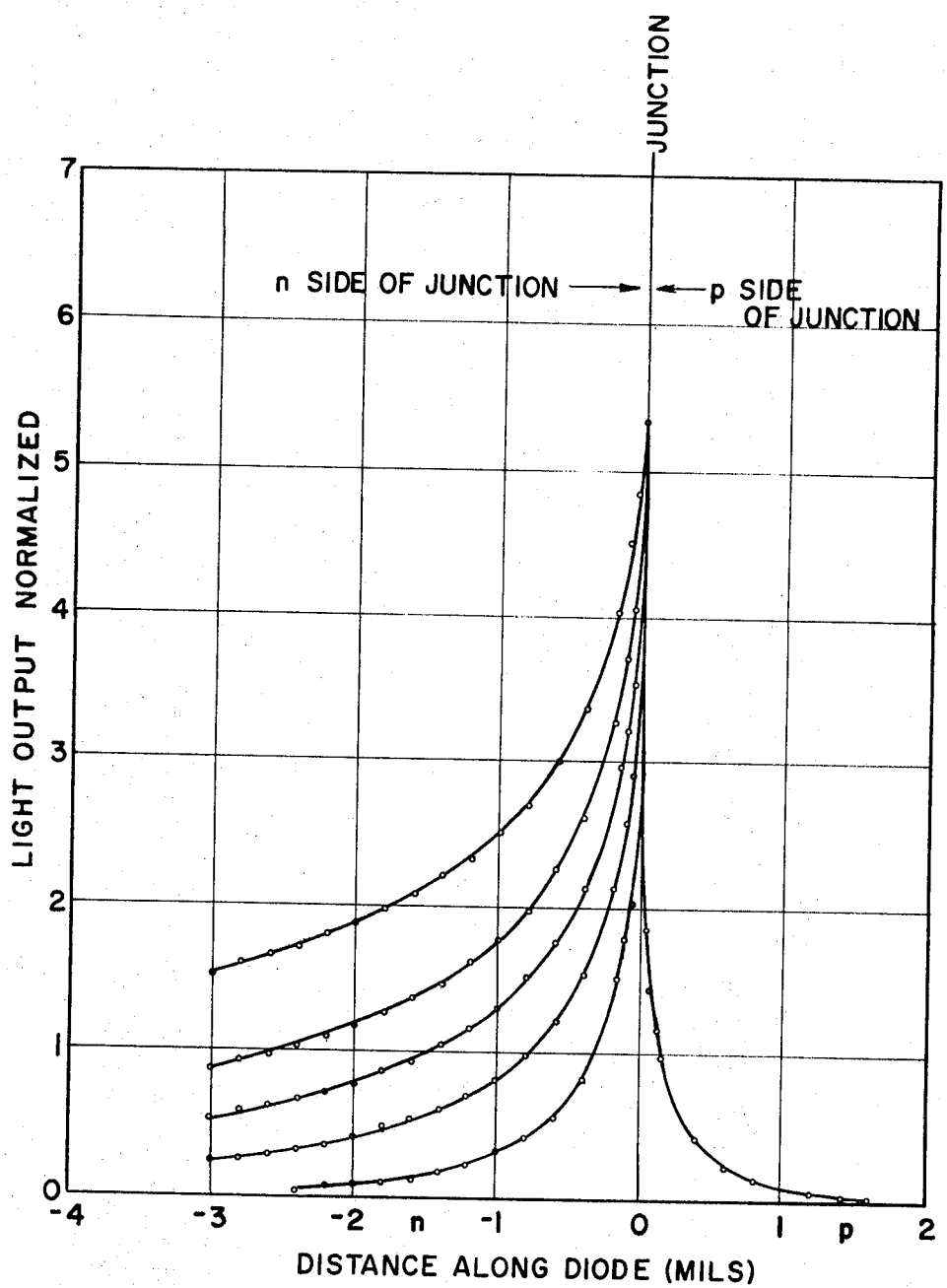
Figure 4:
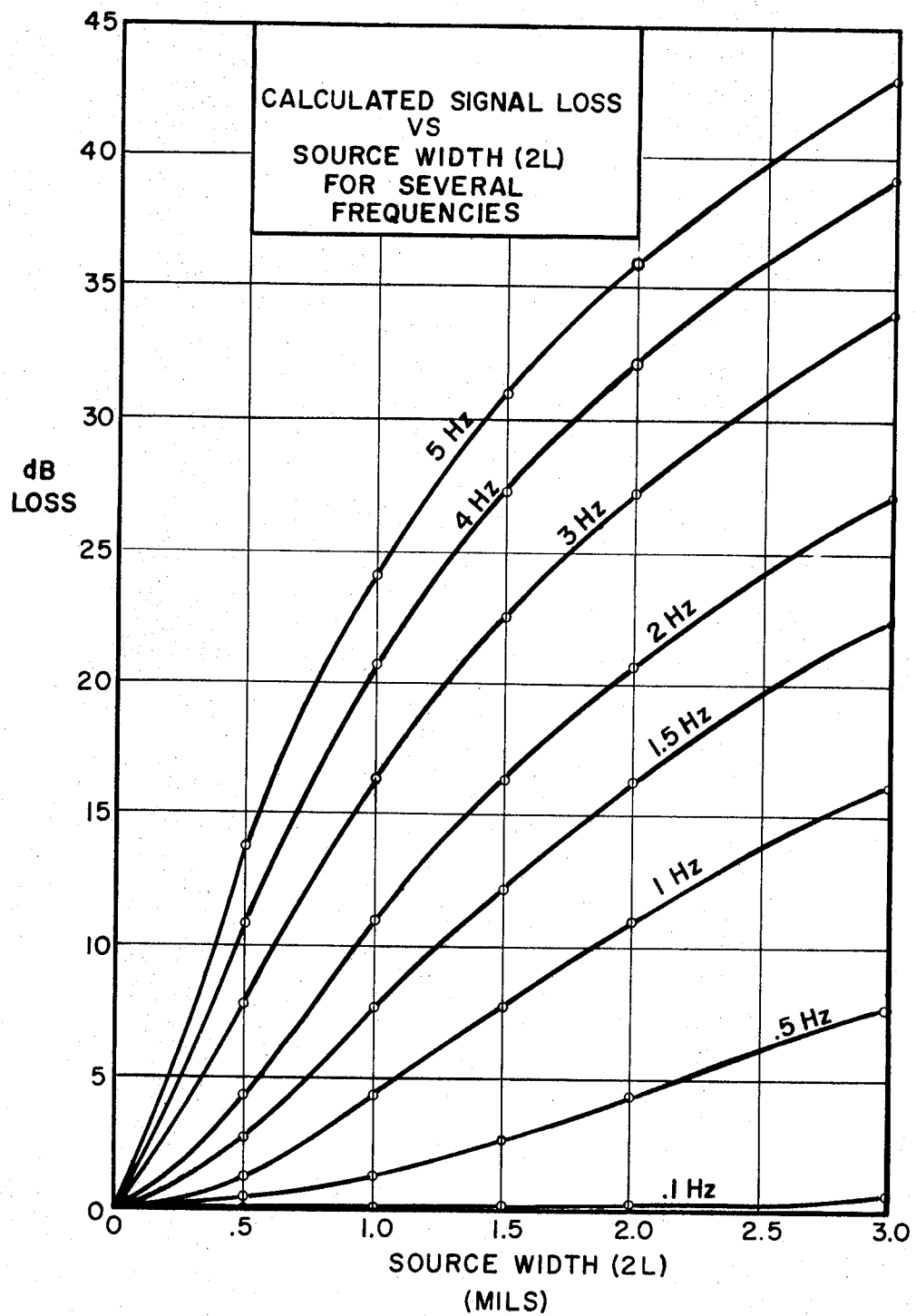

FIG. 3 is a plot of the calculated distribution of light at the diode surface as a function of absorption coefficient; and FIG. 4 is a plot of calculated signal loss versus exponential source width for various frequencies recorded on Super 8 photographic film, i.e., on film which moves past a readout slit at 4 inches per second. Losses due to the projector readout system are not included in FIG. 4.

DESCRIPTION OF PARTICULAR EMBODIMENT

Figure 1:
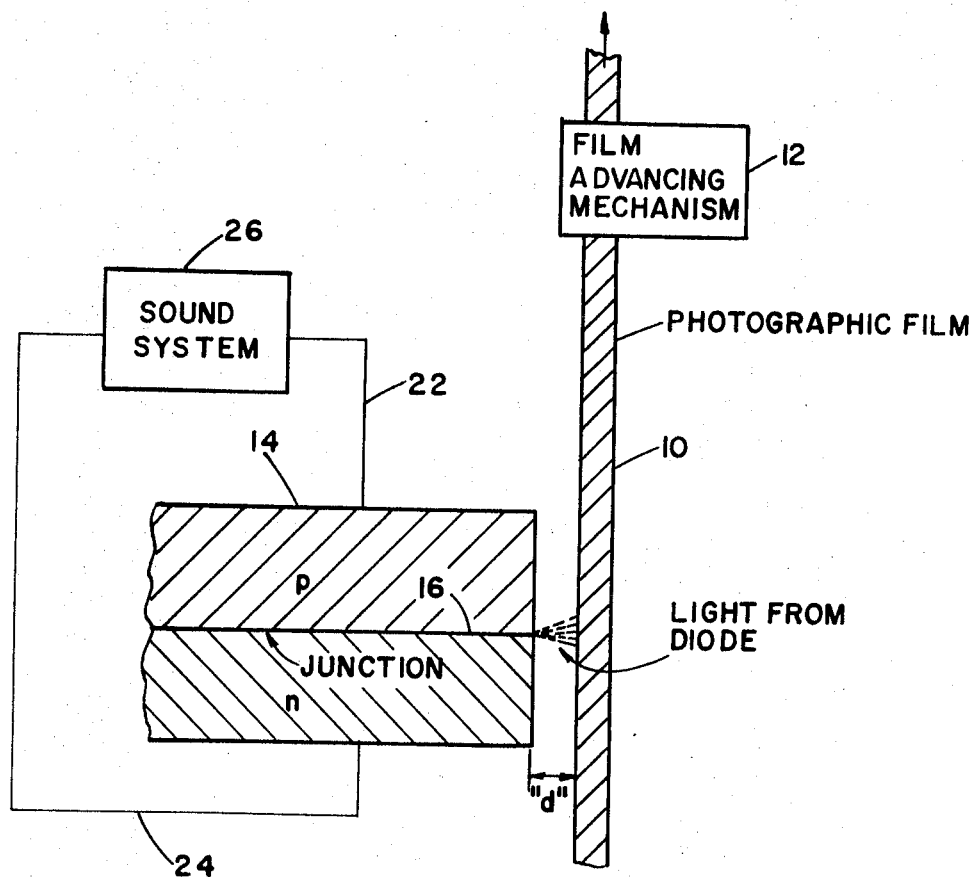
FIG. 1 is a diagrammatic, schematic representation of one preferred embodiment of the invention.

A sound recording system in accordance with the invention is indicated in the highly diagrammatic representation shown in FIG. 1. In this drawing, the photographic film is indicated at 10, this film being suitably advanced at a constant speed by a film advancing mechanism schematically indicated at 12. Closely adjacent the film is positioned a junction diode shown generally at 14 and having a light-emitting junction at 16. The diode is connected, by leads 22 and 24, to a conventional sound system 26.

In one preferred embodiment of the invention, the junction diode 14 is silicon carbide and has a heavily doped P layer on a heavily doped N-type crystal.

The PN junction was produced in accordance with the following nonlimiting example:

EXAMPLE

A small high purity graphite (less than 5 p.p.m. ash) crucible that had a central pedestal surrounded by a groove was supported inside of a quartz tube on the outside of which was positioned an induction coil energized by a 10 kw. radio frequency generator.

The crucible was outgassed at 1500° C. for 10 minutes in hydrogen, flushed for five minutes in helium, and then the temperature was increased to 1900° C. on top of the pedestal for 10 minutes. The system was then cooled and the crucible removed. One gram of silicon was placed in the groove with 100 mg. of pure crystalline boron. Some grains of the crystalline boron remained on top of the pedestal. An "N" type silicon carbide crystal containing 800—1300 parts per million nitrogen was placed on top of the pedestal. The bottom surface of the crystal had been polished with one-fourth micron diamond paste. Resistivity of the crystal was approximately 0.009—0.03 ohm cm. and the mobility was approximately 30 cm²/V-sec. The crystal had an absorption of about 90 to 100 cm⁻¹.

The crucible, with the crystal, was then replaced in the quartz tube. The crucible temperature was raised to 1300° C. in hydrogen for 10 minutes. The tube then was flushed with helium for five minutes. After flushing, the helium gas flow was controlled at 1 cu. ft./hr. and the temperature raised to 1980° C. (on the surface of the crystal) for 10 minutes. The system was then cooled and the crystal removed from the crucible.

The crystal was then processed in the following manner:
1. The crystal was contacted on both sides with a pure silver contact using $TiH_2$ as a flux in a helium atmosphere at 1000° C.
2. The crystal was then trimmed to a small block (1.2 mm. × 1.0 mm., approximately).

One surface of the block was polished with one-fourth micron diamond dust.

The quantum efficiency of light emanating from the diode was determined with a photomultiplier tube before polishing. In this case the quantum efficiency was calculated as the number of photons out divided by the number of electrons passing through the diode. The output of photons per second was found by measuring the light output of the diodes with a photomultiplier using the published tube data, and the input of electrons per second was found by measuring the diode current and using the relationship 1 Amp. = $6.28 \times 10^{18}$ electrons per second.

The final diced diode had an "N" section which was dark green, and the PN junction had a "P" regrown region about 0.0015 inch thick. This "N" type crystal had an absorption coefficient of approximately 100 $cm.^{11}$ for light of wavelength of 6000 A. The "P" type layer had an absorption coefficient of approximately 100—200 $cm.^{11}$ of the same wavelength. When this diode was biased in the forward direction, it emitted strong yellow light having quantum efficiency of about $0.4 \times 10^{1a6}$ in a narrow flat beam emanating from the junction.

The diode had the following physical characteristics:
Length (across film) 1.2 mm.
Width (parallel to "$d$") 1.0 mm.

The diode was used to record sound on 8 mm. Kodachrome IIA color film. With the diode being held in contact with the film surface, the film was advanced at 4 inches/second past the diode. The diode bias current was 50 ma. (4.2 amps./$cm.^2$) and the diode current modulation was about 100 percent. The maximum transmission corresponding to the sum of the bias current and the DC equivalent of the modulation measured on a Kodak 1A densitometer (eye as sensing element), was 1.4 percent. When employing a linear amplifier, i.e. one having equal gain or amplification for all frequencies, the recorded sound had a useful upper frequency (i.e. down 20 db.) of approximately 2400 cycles per second.

In the preceding example, the photographic film was developed using standard techniques normally employed at commercial photographic processing laboratories.

Figure 2:
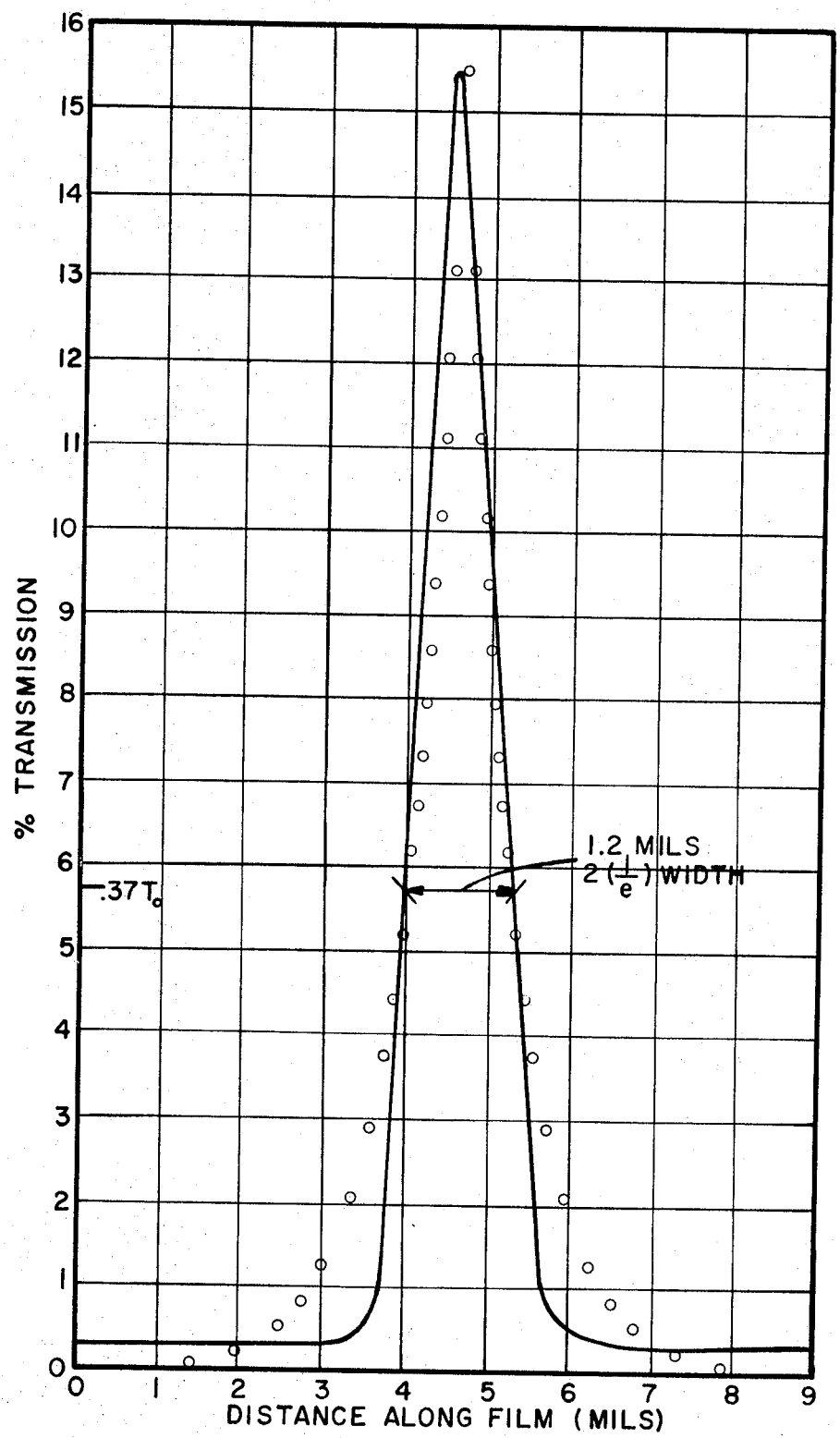
FIG. 2 is a plot of microdensitometer readings of an image pulse recorded on Kodachrome IIA color photographic film.

Shown in FIG. 2 is a microdensitometer trace of transmission (exposure) vs. distance (in the direction in which the film would normally be moved) along the surface of an exposed Kodachrome IIA color film purchased from Eastman Kodak Company. This film was exposed, while stationary, to an electroluminescent silicon carbide junction diode prepared generally in the manner outlined in the Example, the edge of the diode being substantially in contact with the film. The exposure was accomplished by passing 20 pulses of 50 ma. current and 200 microseconds duration through the diode. In FIG. 2, the actual microdensitometer readings were made using a slit width of two microns and are shown as the solid line.

A plot of a mathematical model of exponential distribution of light is also indicated by the discrete points in FIG. 2. This model is quite sharply peaked and the intensity decreases sharply at increasing distances measured in a direction normal to the junction. The characteristic width of the mathematical model at the $1/e$ point (0.37 percent) is set to have a value on the order of 1.2 mils which is the same as that of the measured recorded image. This mathematical model also assumes transmission $T_0$ to be equal to 15.5 percent which is the same as the recorded image. The similarity between the shape of the model and measured curve is readily apparent.

The transmission curve in FIG. 2 also demonstrates the very useful narrowness of the upper portion of the measured curve as well as its broad base. The measured width of the curve at $0.8\ T_0$ (20 percent below the peak) is only about 0.5 mil.

Referring now to FIG. 3, there is shown a family of curves of calculated light intensity distribution at the face of a silicon carbide diode. In these curves one side of each diode is assumed to have an absorption coefficient of 200 $cm.^{11}$, and the other side is plotted for various different absorption coefficients ranging from 0 to 100 $cm.^{11}$. These were calculated on the assumption of an index of refraction of 2.6. As can be seen the $1/e$ width ($2L$) of the curve having an N side absorption of 100 $cm.^{11}$ and a P side absorption of 200 $cm.^{11}$ is about 0.5 mil. If both sides are assumed to have an absorption coefficient of 100 $cm.^{11}$, the $1/e$ width becomes about 0.8 mil. In considering FIG. 3, it is important to bear in mind that the calculated light distribution pattern is that of the light at the surface of the diode as distinguished from the light image recorded by the film; this latter image having a $1/e$ width which is about 0.4 to 0.6 mil wider than the $1/e$ width of the light emitted from the diode.

The effect of widening of the recorded image width on signal loss can be seen by reference to FIG. 4 wherein calculated db. loss of transmission variation in the film, i.e. signal is plotted against the total characteristic $1/e$ width ($2L$) in mils of the recorded image. If a frequency response of 4,000 cycles per second is desired and if it is desired to have no more than about 30 db. loss (without equalization), it will be seen that a total characteristic $1/e$ width of about 1.6 mils is required.

While the invention has been particularly described above in a system adapted for recording sound, it is equally useful for recording other data. For example, the system can be utilized for storing computer data on photographic film and may be used by suitable scanning for creating a visible image on film from a television or other electrical signal. Similarly, the invention can be employed with electroluminescent materials other than silicon carbide, for example gallium arsenide or gallium arsenide phosphide diodes when the necessary high absorption coefficients are provided on both sides of the PN junction. These materials have the added advantage of a higher index of refraction, e.g. on the order of 3.4—3.6.

Since certain changes can be made in the above apparatus without departing from the scope of the invention herein involved, it is intended that all matter contained in the above description shall be interpreted as illustrative and not in a limiting sense.

What I claim is:
1. A system for recording data on a photographic film comprising means for creating relative motion between said photographic film and a light source at a constant speed, said light source comprising an electroluminescent junction diode, the plane of the junction being generally perpendicular to the direction of relative motion, one edge of the diode being positioned less than about 0.001 inch from the surface of the film, the junction diode comprising a base crystal containing one type of impurity, a layer on said crystal containing a second type impurity to form a PN junction diode, said diode being formed of a semiconductor material having P and N regions forming a light-emitting PN junction, the P and N regions adjacent the junction each having an absorption coefficient for the light generated in the diode on the order of 100 $cm.^{11}$ and above, and the index of refraction of the semiconductor material being at least as great as 2.5, whereby the light emitted from the diode in the vicinity of the plane of the junction has a $1/e$ width of less than 1.0 mil, and means for modulating current fed to the diode in accordance with a signal to be recorded on film.

2. The system of claim 1 wherein the diode is formed of silicon carbide.